United States Patent
Yang et al.

(10) Patent No.: US 9,813,853 B2
(45) Date of Patent: Nov. 7, 2017

(54) MESSAGE TRANSMISSION METHOD

(71) Applicant: CHUNGHWA TELECOM CO., LTD., Taoyuan (TW)

(72) Inventors: Shih-Cheng Yang, Taoyuan (TW); Jia-Ming You, Taoyuan (TW); Cheng-Yang Chen, Taoyuan (TW)

(73) Assignee: CHUNGHWA TELECOM CO., LTD., Taoyuan (TW)

( * ) Notice: Subject to any disclaimer, the term of this patent is extended or adjusted under 35 U.S.C. 154(b) by 242 days.

(21) Appl. No.: 14/623,484

(22) Filed: Feb. 16, 2015

(65) Prior Publication Data

US 2016/0128107 A1    May 5, 2016

(30) Foreign Application Priority Data

Nov. 3, 2014    (TW) .............................. 103137979 A

(51) Int. Cl.
| | |
|---|---|
| H04W 4/02 | (2009.01) |
| H04W 40/20 | (2009.01) |
| H04W 40/24 | (2009.01) |
| H04W 76/02 | (2009.01) |
| H04W 4/00 | (2009.01) |
| H04W 84/12 | (2009.01) |

(52) U.S. Cl.
CPC .............. *H04W 4/02* (2013.01); *H04W 4/008* (2013.01); *H04W 40/20* (2013.01); *H04W 40/244* (2013.01); *H04W 40/246* (2013.01); *H04W 76/021* (2013.01); *H04W 84/12* (2013.01); *Y02B 60/50* (2013.01)

(58) Field of Classification Search
CPC . H04W 40/244; H04W 40/20; H04W 76/021; H04W 4/02
See application file for complete search history.

(56) References Cited

U.S. PATENT DOCUMENTS

2006/0172697 A1    8/2006   Gallego et al.
2009/0131079 A1    5/2009   Sekhar
(Continued)

FOREIGN PATENT DOCUMENTS

| CN | 102802132 A | 11/2012 |
|---|---|---|
| CN | 102821443 A | 12/2012 |
| TW | 201301918 A1 | 1/2013 |

*Primary Examiner* — Omer S Mian

(74) *Attorney, Agent, or Firm* — Amin, Turocy & Watson LLP

(57) ABSTRACT

A message transmission method includes steps of receiving a identifier of a first wireless transmitter by a first portable device; transmitting associative message of the wireless transmitter by the first portable device; retrieving the identifier of the targeted wireless transmitter according to the identifier transmitted by the first wireless transmitter; linking the associative message of the wireless transmitter with the identifier of the targeted wireless transmitter; verifying the identifier of the targeted wireless transmitter with a identifier transmitted by a second wireless transmitter and received by a second portable device to confirm whether the identifier is the same or not; and if the identifier is the same, the second portable device retrieves wireless transmitter associative message which is associative to the identifier of the targeted wireless transmitter for later application.

12 Claims, 9 Drawing Sheets

(56) References Cited

U.S. PATENT DOCUMENTS

| | | | |
|---|---|---|---|
| 2015/0348004 A1* | 12/2015 | Eramian | G06Q 20/3224 |
| | | | 705/40 |
| 2015/0350910 A1* | 12/2015 | Eramian | H04W 12/08 |
| | | | 726/6 |
| 2016/0037439 A1* | 2/2016 | Shamis | H04W 48/16 |
| | | | 370/329 |
| 2016/0044583 A1* | 2/2016 | Bahram Pour | H04W 4/008 |
| | | | 455/456.3 |
| 2016/0094946 A1* | 3/2016 | Keithley | H04W 4/023 |
| | | | 455/456.3 |
| 2016/0112838 A1* | 4/2016 | Kaushik | H04W 4/023 |
| | | | 455/456.3 |

* cited by examiner

| identifying information(or identifier) of source Beacon | identifying information(or identifier) of targeted Beacon |
|---|---|
| bc1_id | bc2_id, bc3_id |
| bc2_id | bc3_id, bc4_id |

| identifying information(or identifier) of Beacon | emergency | message start time | message end time |
|---|---|---|---|
| bc1_id | message 1 | 2014.07.24.15.00 | 2014.07.25.15.00 |
| bc2_id | help me | 2014.07.24.15.00 | 2014.07.24.15.30 |
| bc3_id | help me | 2014.07.24.15.00 | 2014.07.24.15.30 |
| bc4_id | no message | N/A | N/A |

| serial number | identifying information(or identifier) of Beacon | coordinate |
|---|---|---|
| 1 | bc21_id | x21, y21 |
| 2 | bc22_id | x22, y22 |
| 3 | bc23_id | x23, y23 |
| 4 | bc24_id | x24, y24 |
| 5 | bc25_id | x25, y25 |
| 6 | bc26_id | x26, y26 |
| 7 | bc27_id | x27, y27 |
| 8 | bc28_id | x28, y28 |
| 9 | bc29_id | x29, y29 |
| 10 | bc210_id | x210, y210 |
| 11 | bc211_id | x211, y211 |

Fig. 10

MESSAGE TRANSMISSION METHOD

BACKGROUND OF THE INVENTION

1. Field of the Invention

The present invention is related to a message transmission method. More particularly, the present invention is related to a message transmission method using wireless transmitter in assistance of transmitting message to a portable device.

2. Description of the Prior Art

As technologies develops, the portable device is a trend, and how to make user feel convenience of the portable device becomes an issue, wherein message transmission plays an important role.

Nowadays, message can be spread on internet, as long as the portable device is capable of connecting to internet, it can retrieve message via internet. Further, the portable device is able to retrieve message via wireless access point, such as Wi-Fi AP, as long as the device can be connected on and allowed to access data. Although the wireless access point can provide such function, the device has to be capable of internet connection function. Also, the spread message cannot be filtered by geometric conditions.

Conventional message notice method applying geometric conditions has to set up a region in computer system in advance, and then transmit message to the mobile devices in the particular range. The method has to set up particular message and user in the particular region.

Moreover, there are other methods for portable device retrieving message. Such as Taiwan patent No. I441535 "METHOD FOR USING GEOGRAPHIC SIGNAL FINGERPRINT CLUSTER TO IMPLEMENT END-TO-END MESSAGE PUSH", China published No. CN102821443A "Automatic regional-information acquiring method and device based on WIFI (wireless fidelity) technology", China published No. CN102802132A "System and method for carrying out local information service by using wireless local area network", US published No. 20090131079 "METHODS AND SYSTEMS FOR DELIVERING INFORMATION TO MOBILE DEVICES", US published No. 20060172697 "Information broadcasting and support system using mobile devices". But all the aforementioned prior art failed in applying wireless transmitter to solve message notice demand in indoor portion region environment.

SUMMARY OF THE INVENTION

The objective of the present invention is to provide a message transmission method comprising steps of receiving an identifier (i.e. identifying information) of a first wireless transmitter by a first portable device; transmitting associative message of the wireless transmitter by the first portable device; retrieving the i identifier of the targeted wireless transmitter according to the identifier transmitted by the first wireless transmitter; linking the associative message of the wireless transmitter with the identifier of the targeted wireless transmitter; verifying the identifier of the targeted wireless transmitter with an identifier transmitted by a second wireless transmitter and received by a second portable device to confirm whether the identifier is the same or not; and if the identifier is the same, the second portable device retrieves wireless transmitter associative message which is associative to the identifier of the targeted wireless transmitter for later application.

In another preferred embodiment, the message transmission method further comprises steps of: executing an internet cloud to receive the identifier of the first wireless transmitter from the first portable device via communication link; and finding the identifier of at least one second wireless transmitter according to the identifier of the first wireless transmitter by wireless transmitter personal identification searching method.

In another preferred embodiment, the wireless transmitter personal identification searching method comprises steps of: retrieving a wireless transmitter association list; rendering the identifier of the source wireless transmitter as a key to search the wireless transmitter association list; and retrieving the identifier of the targeted wireless transmitter by using associated identifier in the wireless transmitter association list.

In another preferred embodiment, the wireless transmitter personal identification searching method comprises steps of: retrieving position information of the wireless transmitter; determining position of the wireless transmitter according to the identifier of the source wireless transmitter; determining a particular area according to the position of the source wireless transmitter and assigning a wireless transmitter in the particular area as the targeted wireless transmitter; and retrieving the identifier of the targeted wireless transmitter.

In another preferred embodiment, the particular area takes the position of the source wireless transmitter as the center of circle, the distance parameter as radius, which means that the particular area is a circle area.

In another preferred embodiment, the aforementioned wireless transmitter personal identification searching method further comprises steps of: comparing the geometric range covered by the particular area and the geometric range covered by the signal range of the wireless transmitter; and if the two geometric ranges intersect each other, then the wireless transmitter is rendered as the wireless transmitter in the particular area.

In another preferred embodiment, the second portable device is configured to display or broadcast the retrieved wireless transmitter associative message.

In another preferred embodiment, the second portable device is configured to mark the retrieved associative message or the present position of the wireless transmitter by a map application program.

In another preferred embodiment, the present position of the associated message of the wireless transmitter is the setting position of the first wireless transmitter on map.

In another preferred embodiment, the wireless transmitter is set in an indoor environment.

In another preferred embodiment, the wireless transmitter is a Beacon compatible with low power Bluetooth communication protocol.

In another preferred embodiment, the associative message of the wireless transmitter comprises emergency message or advertisement message.

In another preferred embodiment, the wireless transmitter is merely configured for identification and is unable to connect to internet.

As aforementioned described, the message transmission method of the present invention is capable of the following characters:

1. The present invention ensures the user of portable device being able to freely recognize the present location by using nearby wireless transmitter and retrieving message specifically assigned in the location region.
2. The present invention ensures the message being transmitted to the portable device without via wireless transmitter, and that means the wireless transmitter can be unable to connect to internet and reduce construction cost of wireless transmitter.

3. The wireless transmitter mentioned in the present invention can be a small-sized and simple message transmission device. The message covering range, setting location and distribution density of message transmission devices are adjustable to determine message advertising or notice region. Thus the message notice region can be flexibly adjusted.

BRIEF DESCRIPTION OF THE DRAWINGS

FIG. 10 shows a diagram of setting list of wireless transmitter of the second embodiment of the present invention.

DETAILED DESCRIPTION OF THE PREFERRED EMBODIMENT

Figure 1:
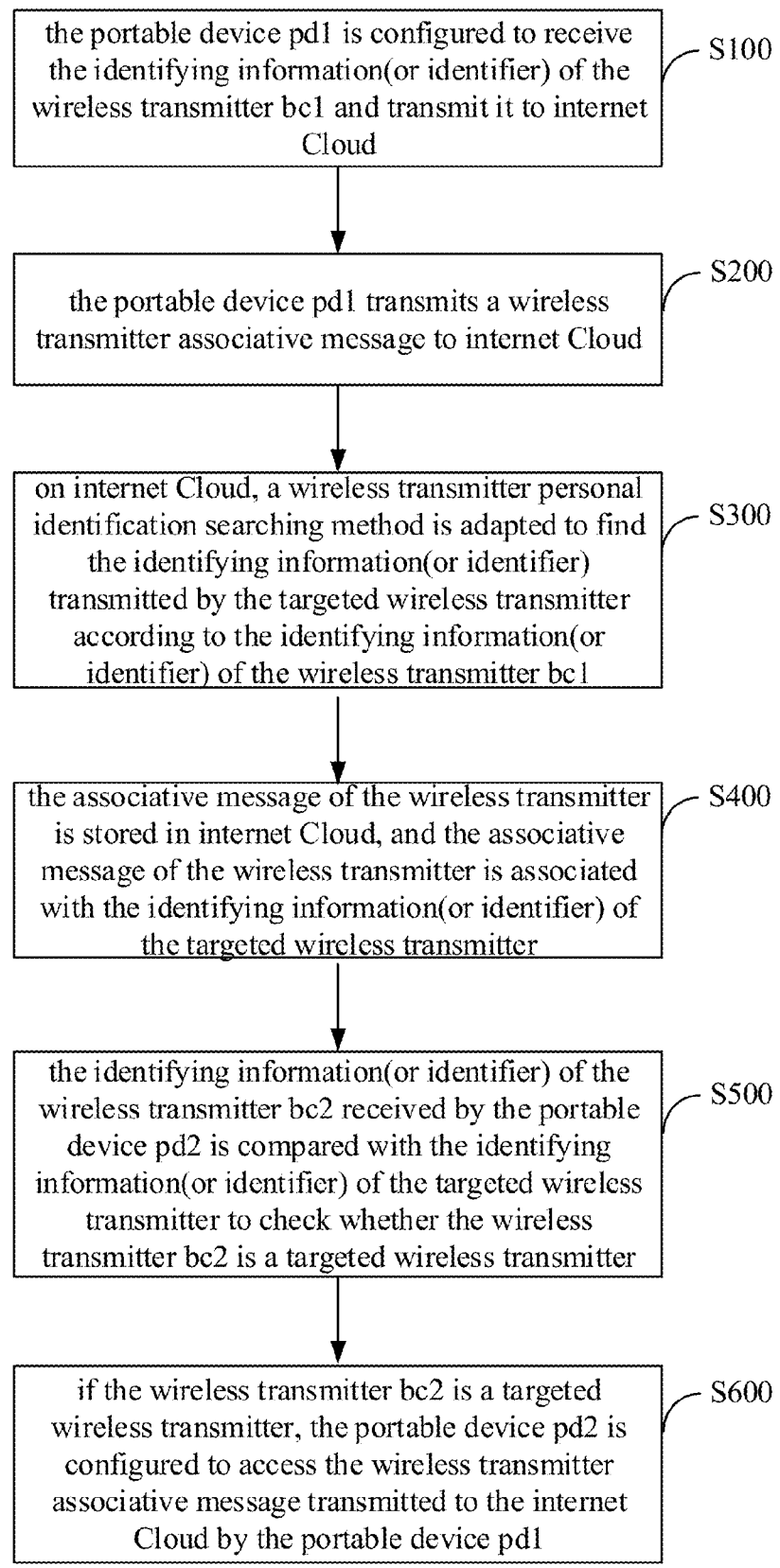
FIG. 1 shows the flow diagram of the message transmission method for transmitting message to portable devices of the present invention.
Figure 2:
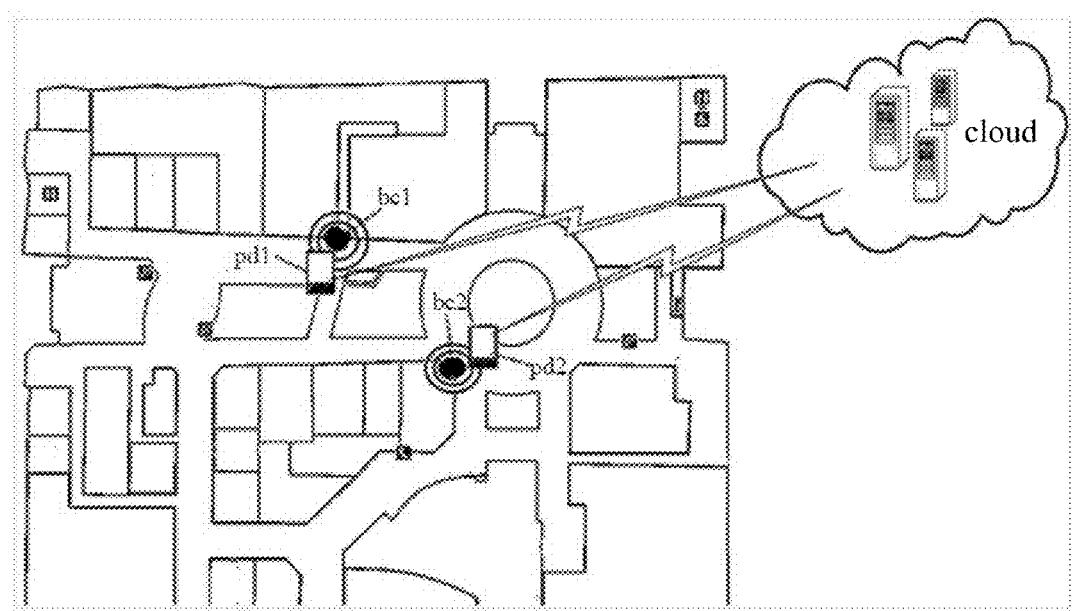
FIG. 2 shows a demonstrative picture of the present invention.

FIG. 1 and FIG. 2 show flow diagram and demonstrative picture of the message transmission method of transmitting message to a portable device of the present invention. The figures show two wireless transmitters bc1 and bc2, wherein each wireless transmitter can be treated as Beacon, which is configured to communicate with other devices by low power Bluetooth 4.0 communication protocol. The figures further show two portable devices pd1 and pd2, which are smart phone and preferably able to communicate with the Beacon via low power Bluetooth 4.0 communication protocol to retrieve the identifier of the wireless transmitter such as UUID, Major, and Minor. The portable devices pd1 and pd2 are able to communicate with internet Cloud via internet communication. The internet Cloud comprises at least a remote server, which is configured to receive the identifier of wireless transmitter and associative message of wireless transmitter from the portable devices pd1 and pd2.

Refer to FIG. 1, in Step S100, the portable device pd1 is configured to receive the identifier of the wireless transmitter bc1 and transmit it to internet Cloud. In Step S200, the portable device pd1 transmits a wireless transmitter associative message to internet Cloud. In Step S300, on internet Cloud, a wireless transmitter personal identification searching method is adapted to find the identifier transmitted by the targeted wireless transmitter according to the identifier of the wireless transmitter bc1. In Step S400, the associative message of the wireless transmitter is stored in internet Cloud, and the associative message of the wireless transmitter is associated with the identifier of the targeted wireless transmitter. In Step S500, the identifier of the wireless transmitter bc2 received by the portable device pd2 is compared with the identifier of the targeted wireless transmitter to check whether the wireless transmitter bc2 is a targeted wireless transmitter. Finally, in Step S600, if the wireless transmitter bc2 is a targeted wireless transmitter, the portable device pd2 is configured to access the wireless transmitter associative message transmitted to the internet Cloud by the portable device pd1.

Figure 3:
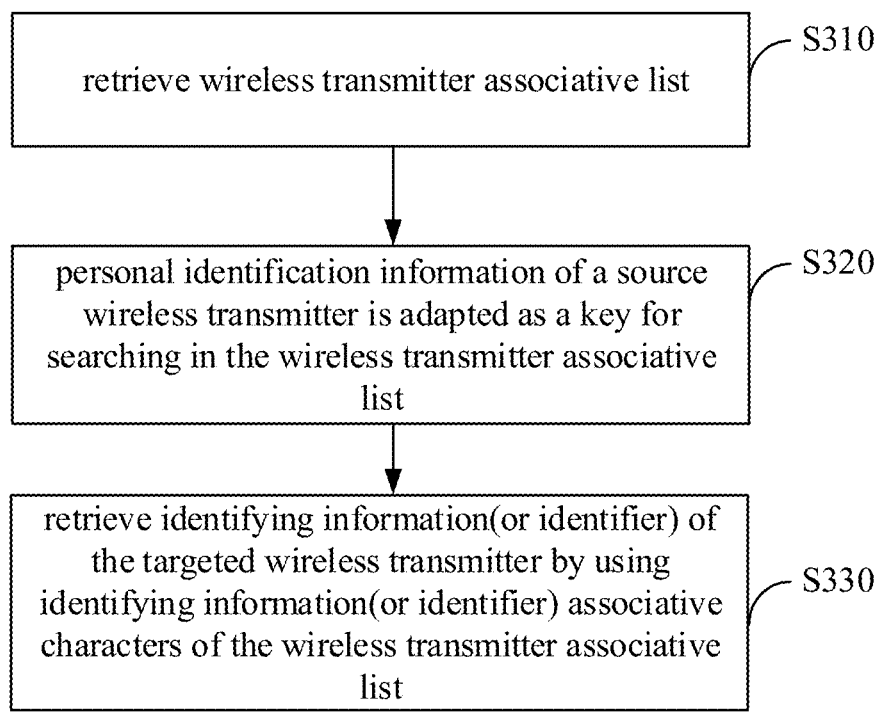
FIG. 3 shows flow diagram of the wireless transmitter personal identification searching method adopted by the present invention.

FIG. 3 shows flow diagram of wireless transmitter personal identification searching method of the present invention. It comprises steps as below. In Step S310, it is executed to retrieve wireless transmitter associative list. In Step S320, the identifier of a source wireless transmitter is adapted as a key for searching in the wireless transmitter associative list. In Step S330, it is executed to retrieve the identifier of the targeted wireless transmitter by using the identifier associative characters of the wireless transmitter associative list.

Figure 4:
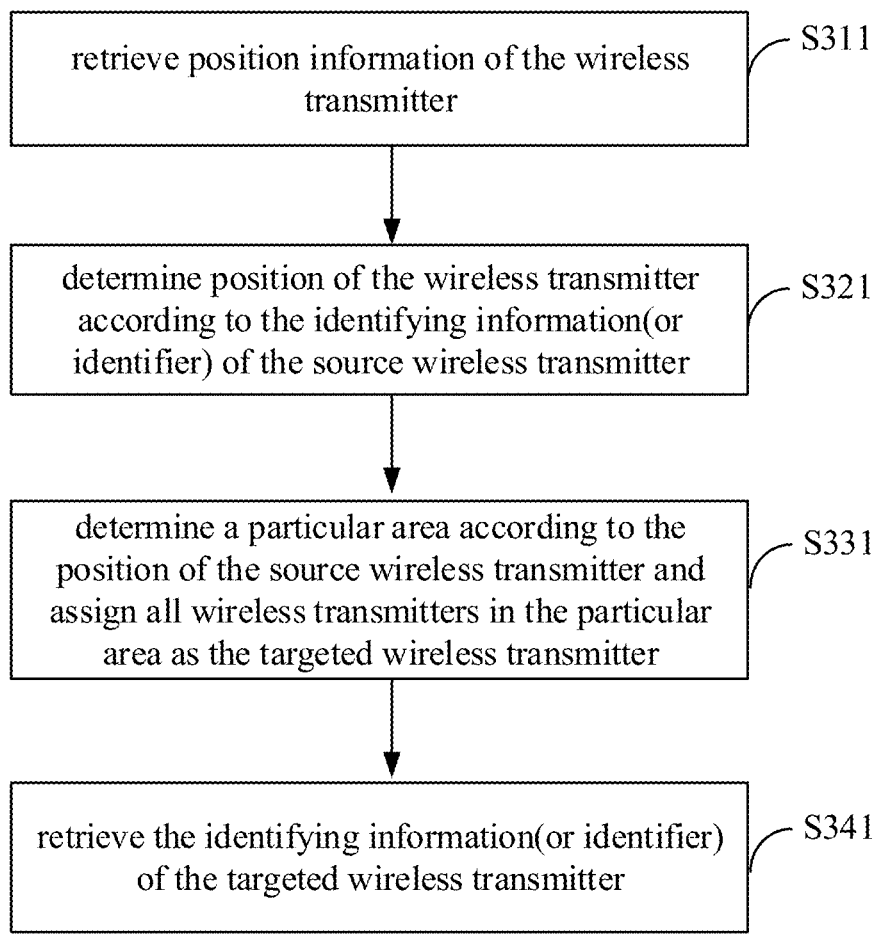
FIG. 4 shows flow diagram of another wireless transmitter personal identification searching method adopted by the present invention.

FIG. 4 shows a flow diagram of another wireless transmitter personal identification searching method of the present invention. It comprises steps as below. In Step S311, it is executed to retrieve position information of the wireless transmitter. In Step S321, it is executed to determine position of the wireless transmitter according to the identifier of the source wireless transmitter. In Step S331, it is executed to determine a particular area according to the position of the source wireless transmitter and assign all wireless transmitters in the particular area as the targeted wireless transmitter. In Step S341, it is executed to retrieve the identifier of the targeted wireless transmitter.

More particularly, in Step S331 of "determining a particular area and assigning all wireless transmitters in the particular area", it comprises steps of: comparing the geometric range covered by the particular area and the geometric range covered by the signal range of the wireless transmitter; and if the two geometric ranges intersect each other, then the wireless transmitter is rendered as the wireless transmitter in the particular area.

To further explain the technical effects of the present invention, the description below illustrates two embodiments, only the present invention is not limited to the embodiments below.

Figure 5:
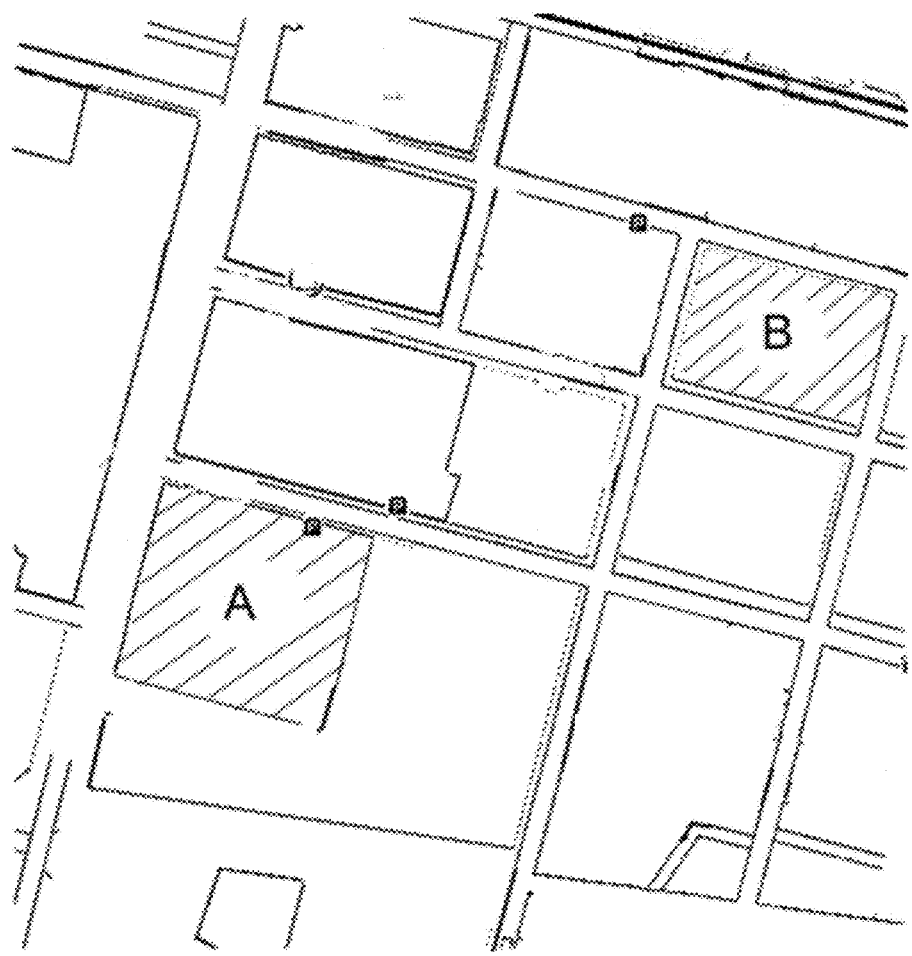
FIG. 5 shows a position diagram of the first embodiment of the present invention.
Figures 6, 7, 8:
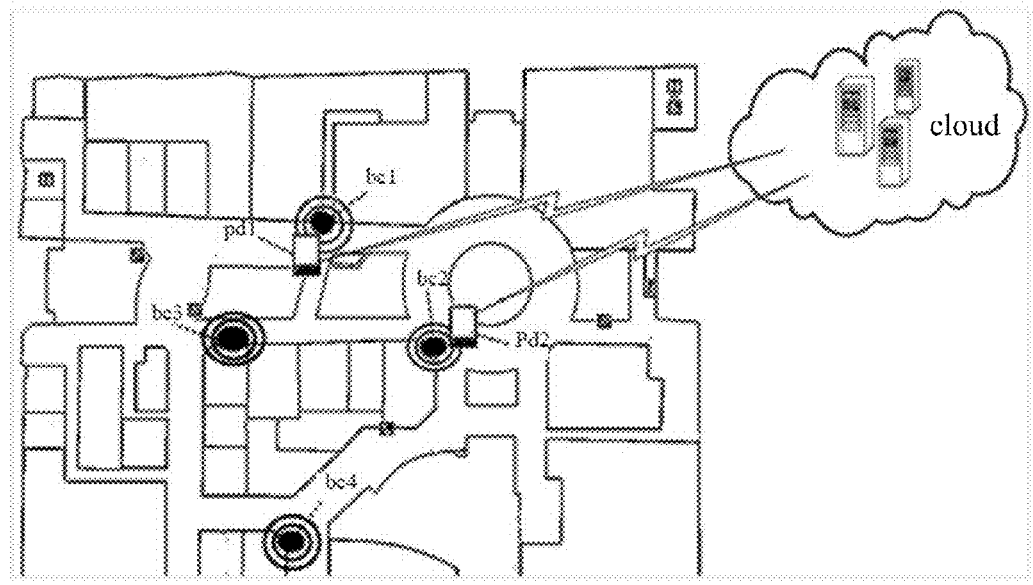
FIG. 6 shows a demonstrative picture of the first embodiment of the present invention.
FIG. 7 shows a diagram of wireless transmitter associative list of the first embodiment of the present invention.
FIG. 8 shows a diagram of emergency message data list of the first embodiment of the present invention.

First Embodiment:

FIGS. 5, 6, 7 show position diagram, demonstrative picture and Beacon associative list of a first embodiment of the present invention. In FIG. 5, A and B respectively represent two positions far apart from each other. In FIG. 6, the area plan view shows indoor plan view of position A, and bc1, bc2, bc3, and bc4 respectively represent four wireless transmitters (Beacon) in the position A for identification without internet communication function, and pd1 and pd2 are held by two persons A and B for Cloud communication and data transmission.

First, the person A transmits a predetermined emergency message, such as "Help me" on the portable device pd1 to the surrounding people. When the person A trigger the action by the user interface of the portable device pd1, the portable device pd1 first does a search and retrieves UUID, Major, Minor information of the closest wireless transmitter bc1, and codes the information into an identifier bc1_id, the identifier bc1_id and emergency message are then transmitted to the internet Cloud. Then refer to FIG. 3 and FIG. 7, when the internet Cloud retrieves Beacon associative list, it uses identifier bc1_id as a key to determine identifier bc2_id and bc3_id of targeted Beacons. Then refer to FIG. 8, it shows diagram of an emergency message data list of the first embodiment of the present invention. It is configured to set emergency message in the identifier bc2_id and bc3_id with an effective time period of the emergency message.

When the person B passes through near the wireless transmitter bc2, the portable device pd2 receives the UUID, Major, and Minor of the wireless transmitter bc2 and codes them into an identifier bc2_id and then transmits the identifier bc2_id to the internet Cloud for personal identification. Refer to FIG. 8, after identification it shows that the identifier bc2_id carries an emergency message, meanwhile the Cloud system time is 15:10, Jul. 24, 2014, which is within the effective time period of the emergency time period. Then the Cloud transmits the emergency message to the portable device pd2.

Refer to FIG. 7 and FIG. 8, if the person B passes through the wireless transmitter bc3, the person B can also receive the message since the identifier bc3_id carries the emergency message too. If the person B passes through the wireless transmitter bc4, the person B would not receive the message since the identifier bc4_id does not carry any emergency message, and the person B is unable to receive the emergency message transmitted by the person A. The source wireless transmitter identifier bc1_id is only corresponding to the targeted Beacon identifier bc2_id and bc3_id, thus, if there is other wireless transmitter set in the position B, and the person B passes through the wireless transmitter, the person B is unable to receive the emergency message.

Figure 9:
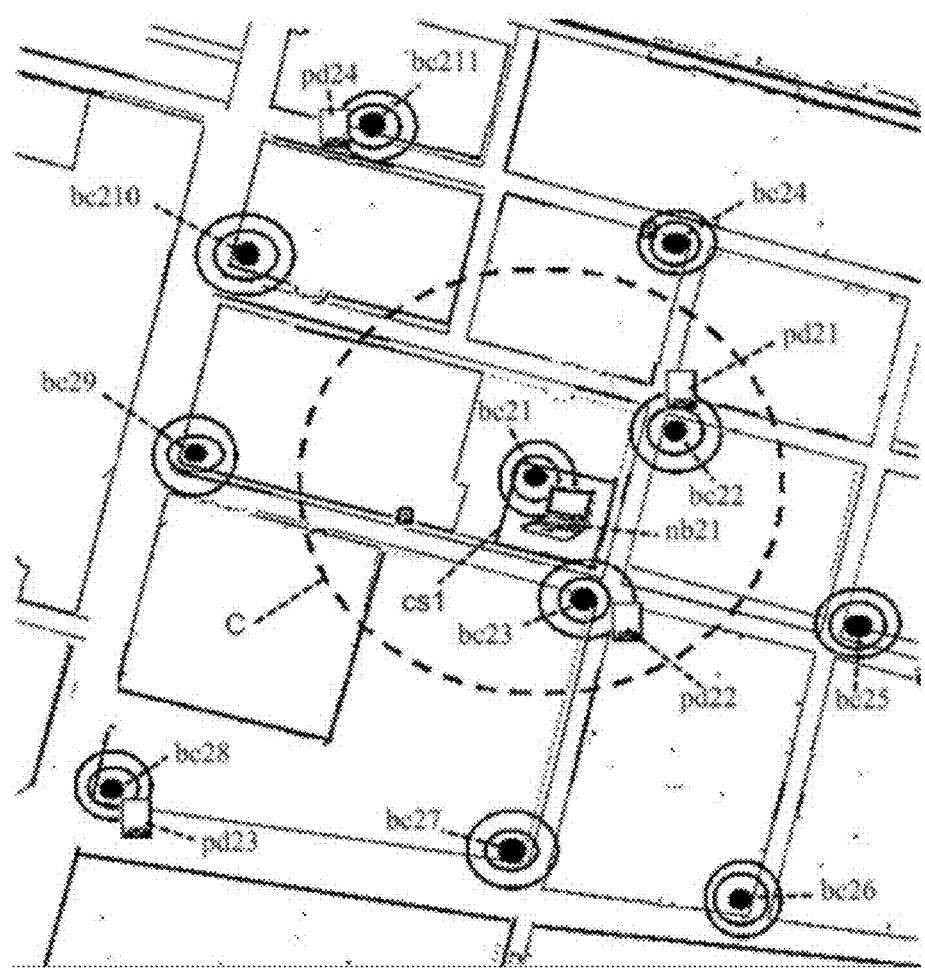
FIG. 9 shows a demonstrative picture of the second embodiment of the present invention.

Second Embodiment:

FIG. 9 and FIG. 10 respectively show demonstrative picture and Beacon distribution of the second embodiment of the present invention. Rectangle cs1 represents a store, and bc21~bc211 respectively represent eleven wireless transmitters, wherein the wireless transmitter bc21 is installed in the store cs1, and nb21 is a notebook belonged to the store cs1 and set inside the store, which is able to communicate with the wireless transmitter bc21 via low power Bluetooth 4.0 communication protocol. Pd21~pd24 are four smart phones, which are able to communicate with the internet Cloud respectively for data transmission and installed with map application program for marking position of message. Dashed circle C represents a border line, the center of circle is the wireless transmitter bc21 and the radius is 500 meters to construct a circular area.

Operation of the second embodiment is described as below. First, a store staff inputs a message via a user interface of the notebook nb21. The message is like "all products 50% off today" for example. The notebook nb21 then scans to find out the nearest wireless transmitter bc21 and retrieves the identifier of the wireless transmitter bc21, then transmits the message and the identifier of the wireless transmitter bc21 to the internet Cloud. Then, refer to FIG. 4, FIG. 9, and FIG. 10, all position information on map of the wireless transmitters are generated on internet Cloud, and the position of the wireless transmitter bc21 is determined based on the identifier of the wireless transmitter bc21. Then the internet Cloud calculates all wireless transmitters located within the circular area defined by the border line C that is, finding out all wireless transmitters located within 500 meters from the wireless transmitter bc21. In the embodiment, the wireless transmitter bc22 and wireless transmitter bc23 meet the conditions and are rendered as targeted Beacons. Then the identifier bc22_id and bc23_id of the targeted Beacons are retrieved and the message from the notebook nb21 is corresponding to the identifier of the targeted Beacons.

Figure 11:
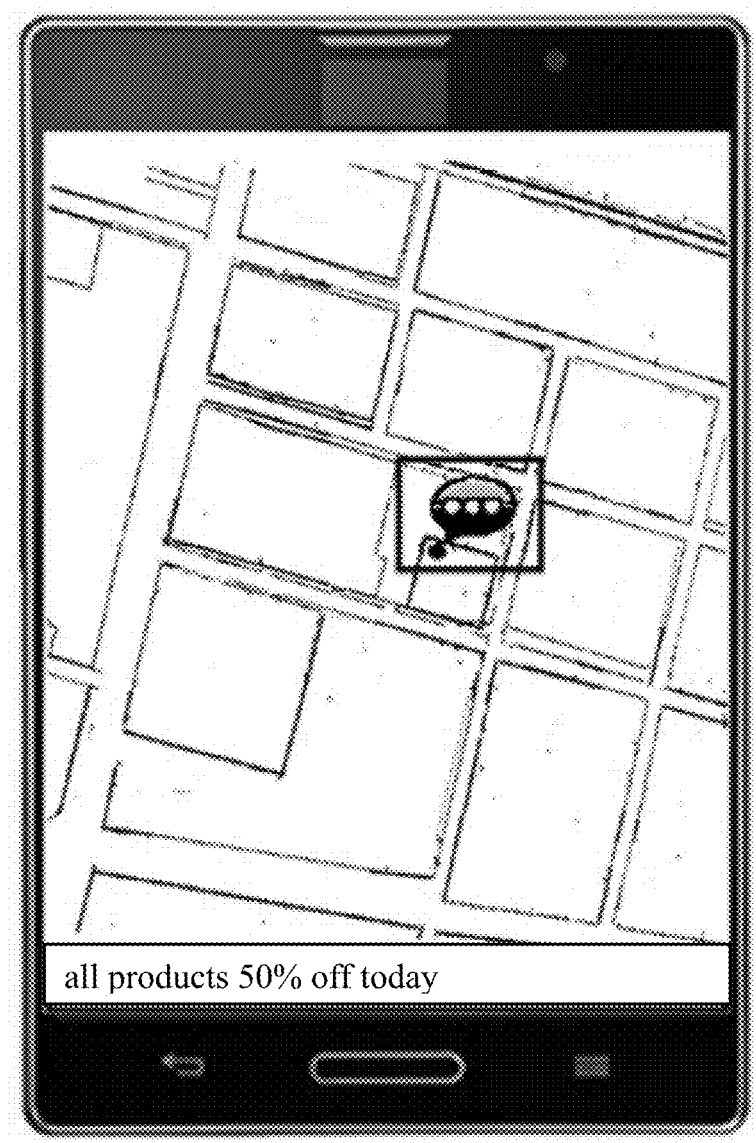
FIG. 11 shows a diagram of following up application of the message of the second embodiment of the present invention.

Later, when the smart phone is able to receive the signal of wireless transmitter bc22 or bc23, for example, the smart phone pd21 or pd22 is able to detect user operation by mechanism of the smart phone, such as detecting displacement by acceleration sensor to know the demand of user. Then the smart phone pd21 or pd22 scans nearby wireless transmitter signal to retrieve the identifier of wireless transmitter. Then the smart phone connects to internet Cloud and uploads the identifier of wireless transmitter. Then the identifier bc22_id or bc23_id of the wireless transmitter is confirmed on internet Cloud. Finally the message corresponding to the identifier bc22_id or bc23_id and the message position of the wireless transmitter are transmitted to the smart phone pd21 or pd22, and the map application program is automatically executed to mark message position for providing the message to the user as shown in FIG. 11.

Then, refer to FIG. 9, the smart phone pd23 and pd24 are near to smart phones bc28 and bc211 instead of being within the circular area defined by border line C, i.e. the message advertising range of the store cs1, and are unable to retrieve the message of the store cs1.

As the aforementioned description, the message transmission method for transmitting message to portable devices of the present invention is able to reduce chance of receiving improper message when the user searches or retrieves message, and ensure the message provider sending the message to proper area to enhance appropriateness of message announcement. The present invention can be applied indoor to enhance flexibility of message transmission in indoor environment.

What is claimed is:

1. A message transmission method for a system comprising of wireless transmitters, portable devices, and an internet cloud, the method comprising steps of:

receiving, by a first portable device, an identifier of a first wireless transmitter;

transmitting, by the first portable device, an associative message and the identifier of the first wireless transmitter to the internet cloud via internet communication;

retrieving, by the internet cloud, an identifier of at least one targeted wireless transmitter according to the identifier of the first wireless transmitter based on a plurality of identifiers for a corresponding plurality of wireless transmitters including the targeted wireless transmitter, the plurality of wireless transmitters being either included in a wireless transmitter associative list searched using the identifier of the first wireless transmitter or located within a predefined radial distance of the first wireless transmitter;

linking, by the internet cloud, the associative message with the identifier of a second wireless transmitter in response to a second portable device detecting the second wireless transmitter and transmitting the identifier of the second wireless transmitter to the internet cloud, the second wireless transmitter being at a geographic location different from the first wireless transmitter;

verifying the identifier of the targeted wireless transmitter with an identifier transmitted by the second wireless transmitter and received by a second portable device to confirm whether the identifier of the targeted wireless transmitter and the second wireless transmitter are the same; and if the verification is not affirmative, the second portable device is unable to retrieve the message from the internet cloud, and if the verification is affirmative, the second portable device retrieves the associative message for later application.

2. The message transmission method as claimed in claim 1, further comprising steps of:
executing the internet cloud to receive the identifier of the first wireless transmitter from the first portable device via a communication link.

3. The message transmission method as claimed in claim 2, wherein retrieving the wireless transmitter identification comprises steps of:
retrieving the wireless transmitter association list;
performing said searching the wireless transmitter association list according to the identifier of the first wireless transmitter; and
retrieving the identifier of the targeted wireless transmitter by using associated identifier in the wireless transmitter association list.

4. The message transmission method as claimed in claim 2, wherein retrieving the wireless transmitter identification comprises steps of:
retrieving position of the first wireless transmitter according to the identifier of the first wireless transmitter;
finding a wireless transmitter in region defined by the predefined radial distance and letting the wireless transmitter be the targeted wireless transmitter according to the position of the first wireless transmitter; and
retrieving the identifier of the targeted wireless transmitter.

5. The message transmission method as claimed in claim 4, wherein the region is a circular region formed by a position of the first wireless transmitter as a center point of the circular region and a distance parameter as radius of the circular region.

6. The message transmission method as claimed in claim 4, wherein retrieving the wireless transmitter identification further comprises steps of:
comparing a geometric range covered by the region and the geometric range covered by a signal range of a specific wireless transmitter; and
if the two geometric ranges intersect each other, then the specific wireless transmitter is regarded as the targeted wireless transmitter in the region.

7. The message transmission method as claimed in claim 1, wherein the second portable device is configured to display or broadcast the associative message.

8. The message transmission method as claimed in claim 1, wherein the second portable device is configured to mark the associative message or a present position of the first wireless transmitter by a map application program.

9. The message transmission method as claimed in claim 8, wherein the present position of the associative message of the first wireless transmitter is a setting position of the first wireless transmitter on map.

10. The message transmission method as claimed in claim 1, wherein the first wireless transmitter is set in an indoor environment.

11. The message transmission method as claimed in claim 10, wherein the first wireless transmitter is a Beacon compatible with low power Bluetooth communication protocol.

12. The message transmission method as claimed in claim 1, wherein the associative message of the first wireless transmitter comprises emergency message or advertisement message.

* * * * *